(12) United States Patent
Cottam et al.

(10) Patent No.: US 8,534,226 B2
(45) Date of Patent: Sep. 17, 2013

(54) BIRD DRINKER ASSEMBLY WITH A TRIANGULAR SUPPLY LINE

(75) Inventors: Stephen John Cottam, New Plymouth (NZ); Franciscus Maria Wilhelmus Ermerins, Lepperton (NZ)

(73) Assignee: PTN Limited, New Plymouth (NZ)

( * ) Notice: Subject to any disclaimer, the term of this patent is extended or adjusted under 35 U.S.C. 154(b) by 132 days.

(21) Appl. No.: 12/993,472

(22) PCT Filed: May 22, 2009

(86) PCT No.: PCT/NZ2009/000089
§ 371 (c)(1),
(2), (4) Date: Nov. 18, 2010

(87) PCT Pub. No.: WO2009/145644
PCT Pub. Date: Dec. 3, 2009

(65) Prior Publication Data
US 2011/0073044 A1  Mar. 31, 2011

(30) Foreign Application Priority Data
May 26, 2008 (NZ) .......................... 569336

(51) Int. Cl.
*A01K 7/00* (2006.01)
(52) U.S. Cl.
USPC .................. 119/75; 119/72; 119/72.5
(58) Field of Classification Search
USPC .................. 119/72, 72.5, 75, 51.01, 51.5
See application file for complete search history.

(56) References Cited

U.S. PATENT DOCUMENTS

| | | | | |
|---|---|---|---|---|
| 3,520,281 A | * | 7/1970 | Hart | 119/75 |
| 3,952,706 A | * | 4/1976 | Hart | 119/75 |
| 4,157,697 A | * | 6/1979 | Neher | 119/75 |
| 4,221,188 A | * | 9/1980 | Hostetler | 119/72 |
| 4,491,088 A | * | 1/1985 | Hostetler | 119/72.5 |
| 4,527,513 A | * | 7/1985 | Hart et al. | 119/51.5 |
| 4,852,522 A | * | 8/1989 | Uri | 119/72 |
| 4,884,528 A | * | 12/1989 | Steudler, Jr. | 119/72.5 |
| D311,979 S | * | 11/1990 | Wentzel | D25/122 |
| 5,178,079 A | * | 1/1993 | Hostetler | 119/72 |
| 5,245,950 A | | 9/1993 | Johnson | |
| 5,282,440 A | * | 2/1994 | Hostetler | 119/72 |
| D348,546 S | * | 7/1994 | Johnson | D30/132 |
| 5,402,750 A | * | 4/1995 | Katz | 119/72.5 |
| 5,857,429 A | * | 1/1999 | Hostetler | 119/72.5 |

FOREIGN PATENT DOCUMENTS

| | | | |
|---|---|---|---|
| DE | 3911309 | | 11/1990 |
| JP | 411046614 A | * | 7/1997 |
| JP | 11153266 | | 6/1999 |
| WO | WO2008/014323 | | 1/2008 |

* cited by examiner

*Primary Examiner* — T. Nguyen
(74) *Attorney, Agent, or Firm* — Occhiuti Rohlicek & Tsao LLP

(57) ABSTRACT

A supply line for the water supply to poultry house drinkers is triangular in shape with the drinkers secured to a bottom surface around a drinking nipple by a quick-attach rotational movement. The triangular line has a top fin which provides additional bending strength and may have an internal fin to limit movement of the drinking nipple valve.

8 Claims, 3 Drawing Sheets

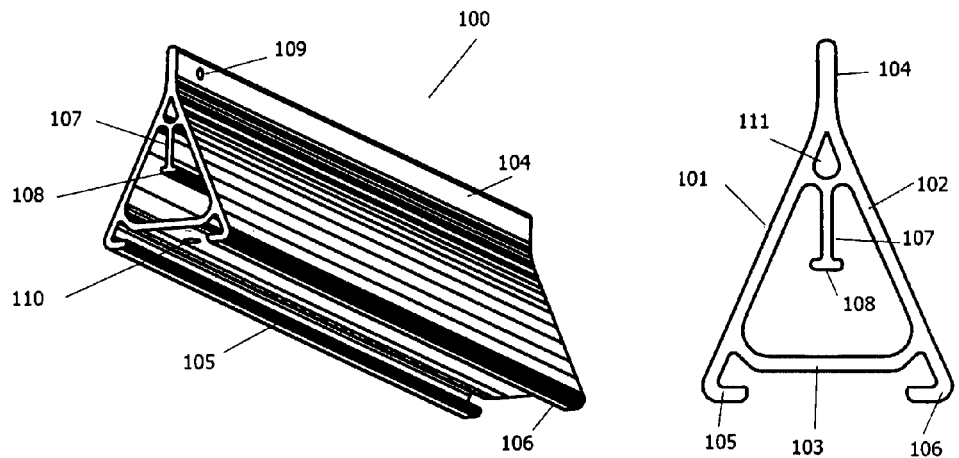
FIG. 1  FIG. 2
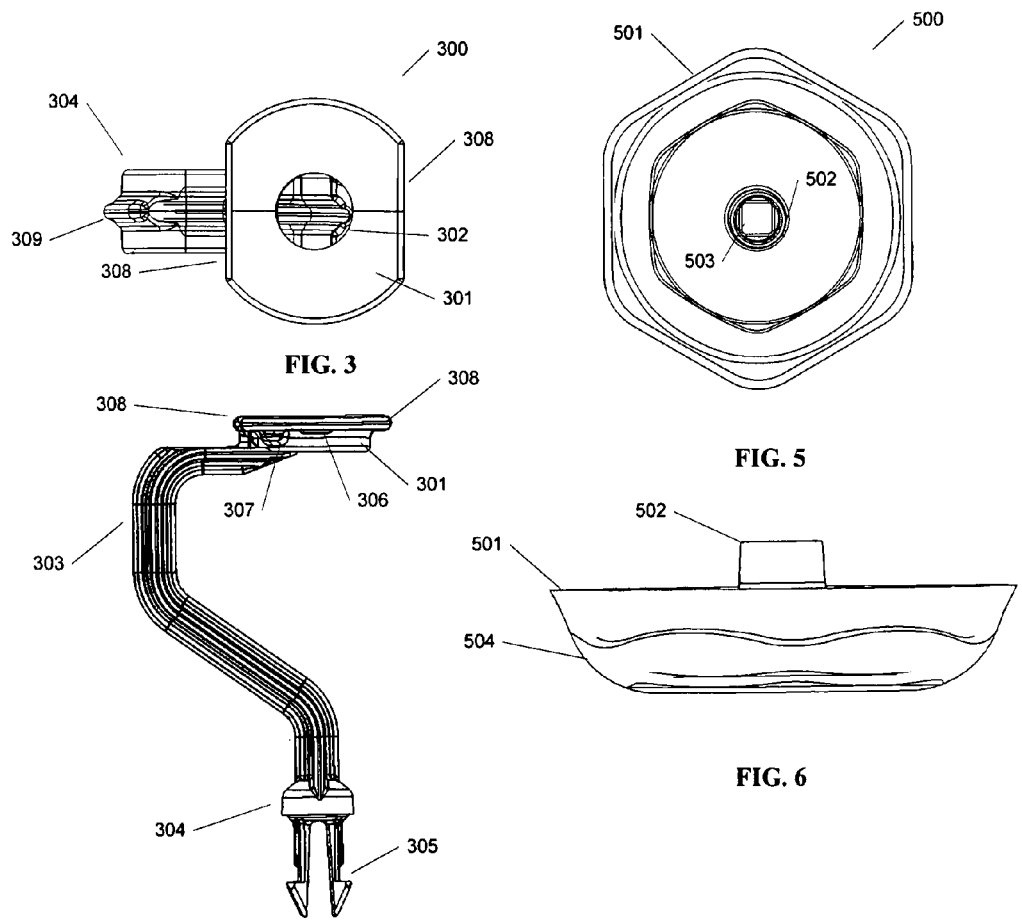
FIG. 3
FIG. 5
FIG. 6
FIG. 4

BIRD DRINKER ASSEMBLY WITH A TRIANGULAR SUPPLY LINE

TECHNICAL FIELD

The invention generally relates to bird drinkers from which birds such as domestic poultry can drink.

More particularly the invention relates to bird drinkers and the water supply to multiple drinkers.

BACKGROUND ART

Articles such as bird drinkers are known and supply to a bird a supply of drinking water. Where drinkers are used in a large scale poultry house multiple drinkers are supplied from a single supply pipeline. Typically the supply is constant or relatively constant and the pressure is controlled to provide the amount of water required by the birds being raised. Chlorination or other medication may be added to the water when required to help the birds remain healthy.

The water supply pipes or lines to which the drinkers are secured tend to collect debris and the drinker connections are difficult to keep clean. Square pipes, as shown in U.S. Pat. No. 5,245,950 are used to help reduce this problem, and are also sized so the height acts to limit the opening of a drinking nipple within the pipe, but the total flow in such a pipe may not be sufficient to supply many nipples because of the limited size of the pipe and additionally the water supply pipe may need additional support because of a lack of rigidity over a longer extent.

In addition such bird drinkers are currently prone to variations in pressure in the supply lines resulting in either inadequate water supply to a drinker or too much water being supplied to a drinker. In the former case where the drinker is used in a poultry house a bird will drink longer at the drinker and tend to drink more, resulting in a bird eating less food and hence growing slower. In the latter case the drinker will tend to drip into the poultry house litter resulting in the growth of fungus or other adventitious organisms, or if the drinker has a drinking cup catching any drips this will fill and tend to trap litter and debris.

U.S. Pat. No. 5,245,950 also shows a drinker bowl clipped to the supply pipe and the complex support system required with the comparatively small flexible pipe to maintain the supply pipe level.

Systems with complex clips and complex supports take considerable time to set up and require considerable maintenance, providing problems for the poultry house operators.

The present invention provides a solution to these and other problems which offers advantages over the prior art or which will at least provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

SUMMARY OF THE INVENTION

In one exemplification the invention consists in a bird drinker assembly of a water supply line or pipe of substantially triangular section having at least one substantially planar surface, a drinker support releasably attached to a planar surface of the water supply line, a drinking nipple affixed to the water supply line adjacent the drinker support and a drinker bowl attached to the drinker support.

Preferably the drinker support has a substantially planar upper surface engaging in use with the planar surface of the supply line.

Preferably the planar upper surface of the drinker support has an aperture through which a drinking nipple engaged in a supply line may project.

Preferably the drinker support supports the drinker bowl directly below the drinking nipple.

Preferably the drinker support provides a depending drinker support arm offset from a line directly below the drinking nipple aperture.

Preferably the drinker support planar surface is shaped to engage projections from the apices of the triangular water supply line.

Preferably the drinker support is engaged with the water supply line by rotation relative to the supply line.

Preferably the drinker support is engaged with the water supply line by elastic engagement with projections on the supply line.

In an alternative aspect the invention relates to a substantially triangular water supply line having suspension means allowing suspension of the water supply line from one apex of the substantially triangular water supply line and retaining means allowing engagement of co-operating poultry drinker bowl supports to at least one planar face of the substantially triangular water line.

Preferably the suspension means is a linear fin extending from the uppermost apex of the triangular water line.

Preferably apertures are provided in the linear extending fin to allow suspension supports to engage the linear extension.

Preferably wherein the retaining means are projections extending from the other two apices Preferably drinking nipples may be securable to a flat face of the water supply line.

Preferably the water supply line has a substantially triangular internal contour and a linear member protruding inwards, the linear member extending to in use limit movement of an inwardly protruding valve member of a drinker nipple located on a planar face of the substantially triangular water line.

Preferably the water supply line includes an embedded strength member.

A third aspect of the invention relates to a bird drinker bowl assembly having a substantially planar surface adapted to engage a water supply line, a depending drinker bowl support and a drinker bowl attached to that support, the substantially planar surface being adapted to releasably engage a substantially planar surface of a water supply line about a drinker valve in that supply line.

Preferably the substantially planar surface engages with projections from a substantially planar face of a water supply line.

Preferably the substantially planar surface engages with projections from a substantially planar face of a water supply line by rotational engagement.

Preferably the drinker bowl support is of substantially cruciform cross-section.

Preferably the drinker bowl is substantially hexagonal in outline.

Preferably the drinker bowl is a snap fit on the drinker support arm.

In an alternative embodiment the invention relates to a water supply for a poultry house, the supply having a supply side and a return side, the supply side supplying water lines to a poultry area and returning to the return line water unused in the poultry area, restriction valves between the water supply and return lines, and in the poultry area supply lines restriction valves in line with the poultry area supply and return lines.

Preferably the supply line may provide for additives to the supply water.

These and other features of as well as advantages which characterise the present invention will be apparent upon reading of the following detailed description and review of the associated drawings.

BRIEF DESCRIPTION OF THE DRAWINGS

FIG. 1 is a general perspective view of a water supply line.
FIG. 2 is an end view of the supply line.
FIG. 3 shows a top view of a drinker bowl support.
FIG. 4 shows a side view of a drinker bowl support.
FIG. 5 shows a top view of a drinker bowl.
FIG. 6 is a side view of a drinker bowl.

DESCRIPTION OF THE INVENTION

Figure 7:
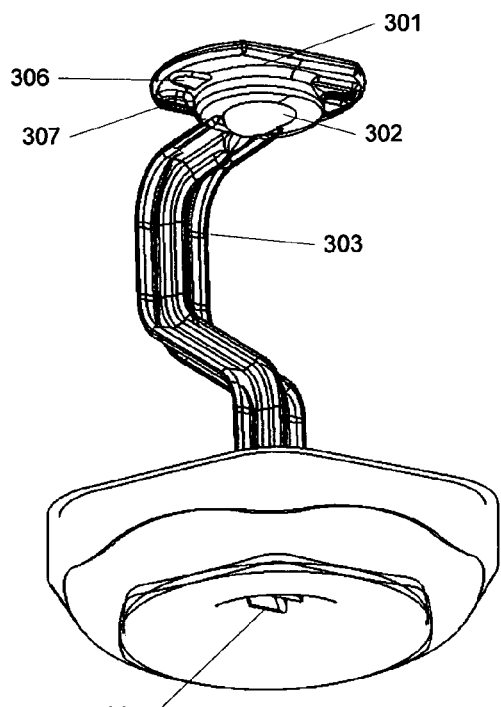
FIG. 7 shows a lower perspective view of an assembled drinker.

Referring now to FIG. 1 a water supply line or pipe 100 for supplying water to a poultry house is shown, though the supply line may be used for other purposes which require an easily movable supply line with high rigidity.

The supply line is a substantially triangular shape with sides 101, 102, 103 and oriented with an upper extending fin 104 from the apex between sides 102 and 103. The lower wall 103 of the supply line is flanked with projections 105, 106 at the other two apices of the supply line which allow a drinker support to be captured by placement of a top pad of a drinker support between the projections and rotation to retain a drinker support in position. A known drinking nipple associated with the drinker support may engage in holes such as 110 placed in the lower wall by screwing or push fit. Holes such as 109 may be placed in the fin to allow the supply line to be suspended from supports.

An inner depending wall 107 may also be provided in the supply line and this may have a stub 108 to engage the valve of a nipple inserted in a hole 110 and restrict or limit its opening movement. This allows the use of valves without valve retaining means. The fin and the internal stub also act to substantially increase the rigidity of the line, allowing long runs without intermediate support. A void 111 within the line may contain a linear strength member such as a steel wire or a foam core to add further strength but exists primarily to control extrusion shrinkage of the line wall.

The fin need not be a simple linear extension but may include features providing additional lateral and vertical rigidity.

The supply line is preferably of extruded polyethene, but other materials may be used.

Lengths of supply line may be joined together or to a standard pipe system by joiners of complementary shape.

FIG. 3 shows a top view of a drinker support arm 300 and FIG. 4 a side view where a top pad 301 which engages face 103 of the supply line has a central hole 302 through which a drinking nipple (not shown) may extend. A cranked arm 303 depends from top pad 301 and extends to a boss 304 and a drinking bowl retention clip 305. The3 arm is preferably of cruciform cross section to provide strength. Pad 301 is generally circular in outline but has clipped edges 308 which allow the pad to be placed between projections 105, 106 of the supply line and then rotated with respect to it so that the pad rotates into place beneath projections 105, 106. Projections 306 on the underside of the pad engage against projections 105, 106 to hold the bowl support arm in place. Buttresses 307 act to engage against projections 105, 106 to limit rotational movement of the support arm.

A drinker bowl 500 is shown in FIGS. 5 and 6 and has a rim 501, preferably with a hexagonal shape, a generally circular bowl 504 and a central boss 502. A square hole 503 in boss 502 accepts clip 305 of the support arm. A hexagonal shape provides rigidity in the bowl. The bowl may be removed from the arm as necessary for cleaning or replacement, and similarly the drinker assembly may easily be removed from the supply line.

Figure 8:
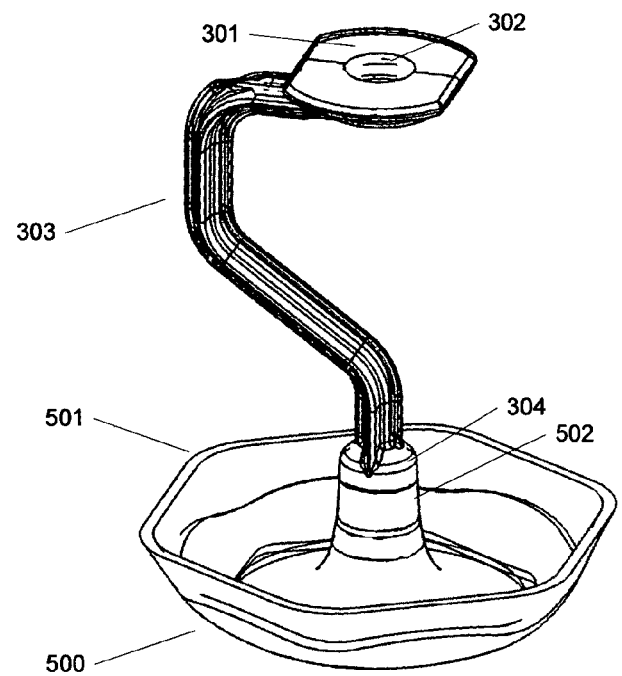
FIG. 8 shows an upper perspective view of an assembled drinker.
Figure 9:
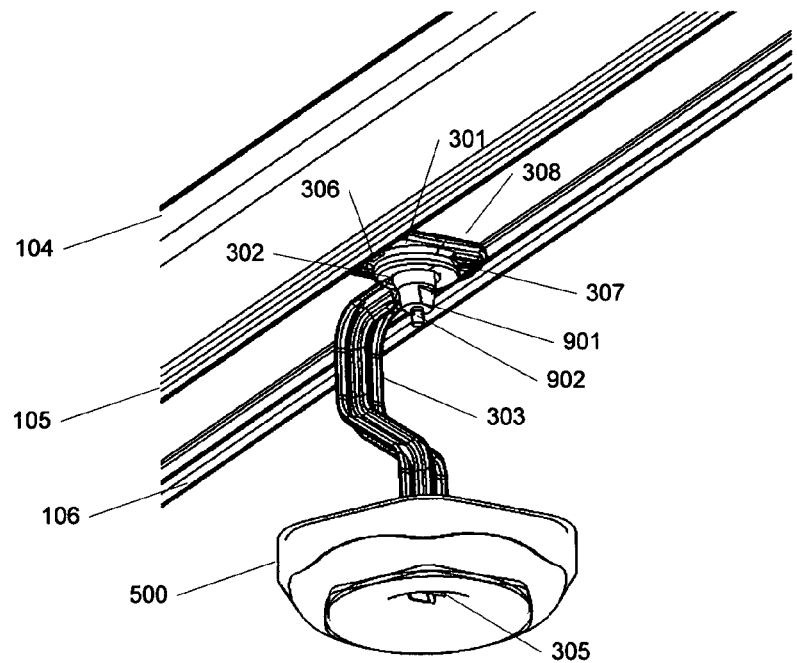
FIG. 9 shows a view of a drinker assembled to the supply line of FIGS. 1 and 2.

FIGS. 7 and 8 show upper and lower perspective views of an assembled drinking bowl and arm and FIG. 9 shows the arm locked in place between projections 105, 106 around a drinking nipple 901 screwed into a hole such as 110 in a supply line.

The arm offset at 303 allows a bird easy access to nipple 901 allowing the bird to either push the central nipple valve 902 upwards or sideways, either movement releasing water which the bird may drink. Any overflow or drips fall into bowl 500 providing a source of available water. At its full upwards movement valve 902 engages stub 108 inside the supply line, preventing the valve from falling upwards from the nipple into the supply line.

The support arm is preferably of polystyrene and may be fibre reinforced.

The drinker bowl is preferably of polyethylene but other materials may be used. While drinkers attached by rotational movement are shown the invention may alternatively allow the use of drinkers clipping to the base of the triangular shape, however the fixing is not as secure and the clips tend to collect debris. Drinkers may be used with lines other than triangular, for instance square or rectangular.

The supply line may be supported from the top fin 104 in such a manner that it can be raised or lowered to accommodate poultry from the chicken stage through to fully grown. Since the supply line runs at a relatively low pressure to prevent water squirting from the drinking nipples when a bird presses a nipple upwards or sideways the change of height is normally sufficient to alter the available head of water.

Supply of water to the supply line therefore needs to be controlled to provide the correct water pressure, and also needs some manner in which any additives to the water will be present at all drinking nipples regardless of their distance from the water supply source.

Figure 10:
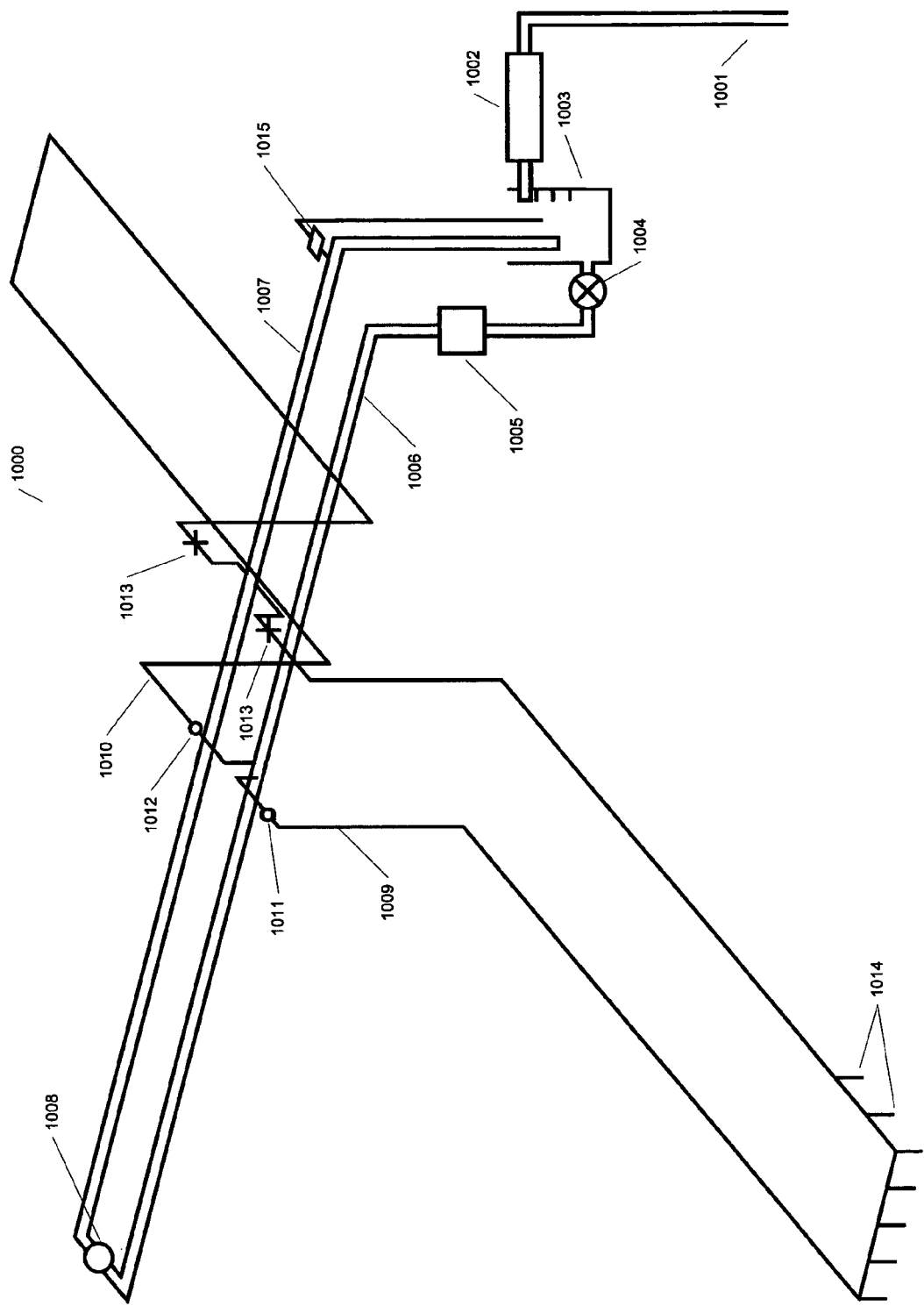
FIG. 10 shows a circulation system to supply poultry house water supply lines.

FIG. 10 shows at 1000 a system for allowing control of the pressure in individual lines while allowing the water to recirculate. The drawing shows an initial water supply 1001 which supplies a tank 1003 via an additive injection system 1002. A pump 1004 extracts water from the tank and provides it to a main supply line 1006 via a main flow controller 1005. From the main supply line the water returns to a main return pipe 1007 via a pressure reduction valve 1008. This valve acts to provide a maximum head to the water in the supply line.

Feeder lines 1009, 1010 supply drinking nipples 1014 before returning the flow to the main return line via pressure reduction valves 1011, 1012. The supply side of the feeder lines may contain flow meters 1013 to measure the water flow in a feeder line so that a line may be shut off if excess use such as flooding is detected, and may also contain additional pressure reduction valves (not shown) to compensate for changes in the supply line height. Placement of the pressure reduction valves or the flow meters on the supply or return sides of the feeder lines may be varied to provide the best empirical results.

The main or return lines may supply many feeder lines, and equally a single feeder line may supply many drinkers.

An analyser 1015 for water makeup and the detection of the level of any medication or additives introduced at injections system 1002 may be provided so that the injection system is controlled to introduce water and additive in the correct relationship.

By using a return system there is some assurance that all water lines are purged and the water makeup is constant throughout the system. Additionally, because of drinking nipple design, small bubbles of air may tend to be drawn into the water supply system and create airlocks in a system with no through flow, however in a return system such bubbles are purged into tank 1003.

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example the particular elements of the supply line and drinkers may vary dependent on the particular application for which it is used without variation in the spirit and scope of the present invention.

In addition, although the preferred embodiments described herein are directed to drinkers for use in a poultry house system, it will be appreciated by those skilled in the art that the teachings of the present invention can be applied to other systems such as rabbits, without departing from the scope and spirit of the present invention.

Industrial Applicability

The water supply line and drinkers of the invention are used in the rearing of poultry or animals. The present invention is therefore industrially applicable.

The invention claimed is:

1. A substantially triangular water supply line comprising three external apices and a substantially triangular internal contour, a substantially linear fin at a first apex extending substantially away from the apex and allowing the water supply line to be suspended by the fin, an at least partially planar surface extending between the second and third apices, wherein the second and third apices are provided with retaining means allowing engagement of co-operating poultry drinker bowl supports to the at least partially planar surface of the substantially triangular water line, and a linear member protruding inwards from the inward side of the first apex to in use limit movement of an inwardly protruding valve member of a drinker nipple located on the at least partially planar surface of the water supply line.

2. A substantially triangular water supply line as claimed in claim 1, wherein apertures are provided in the linear extending fin to allow suspension supports to engage the linear extension.

3. A substantially triangular water supply line as claimed in claim 1, wherein the retaining means are projections extending from the second and third apices.

4. A substantially triangular water supply line as claimed in claim 1, said water supply line further comprising holes in the at least partially planar surface with which drinking nipples may be engaged.

5. A substantially triangular water supply line as claimed in claim 1, wherein the water supply line has a substantially triangular internal contour and a linear member protruding inwards, the linear member extending to in use limit movement of an inwardly protruding valve member of a drinker nipple located on the at least partially planar surface of the substantially triangular water line.

6. A substantially triangular water supply line as claimed in claim 1, wherein the water supply line comprises an embedded strength member.

7. A substantially triangular water supply line as recited by claim 3, wherein the projections allow a drinker support to be captured by placement between the projections and rotation to retain the drinker support in position adjacent to the at least partially planar surface.

8. A substantially triangular water supply line as recited by claim 6, wherein the embedded strength member is located within a wall of the water supply line at or adjacent to the first apex.

\* \* \* \* \*